Dec. 2, 1958 D. DE WITT ET AL 2,863,066
REFLEX CIRCUIT SYSTEM
Filed May 28, 1954
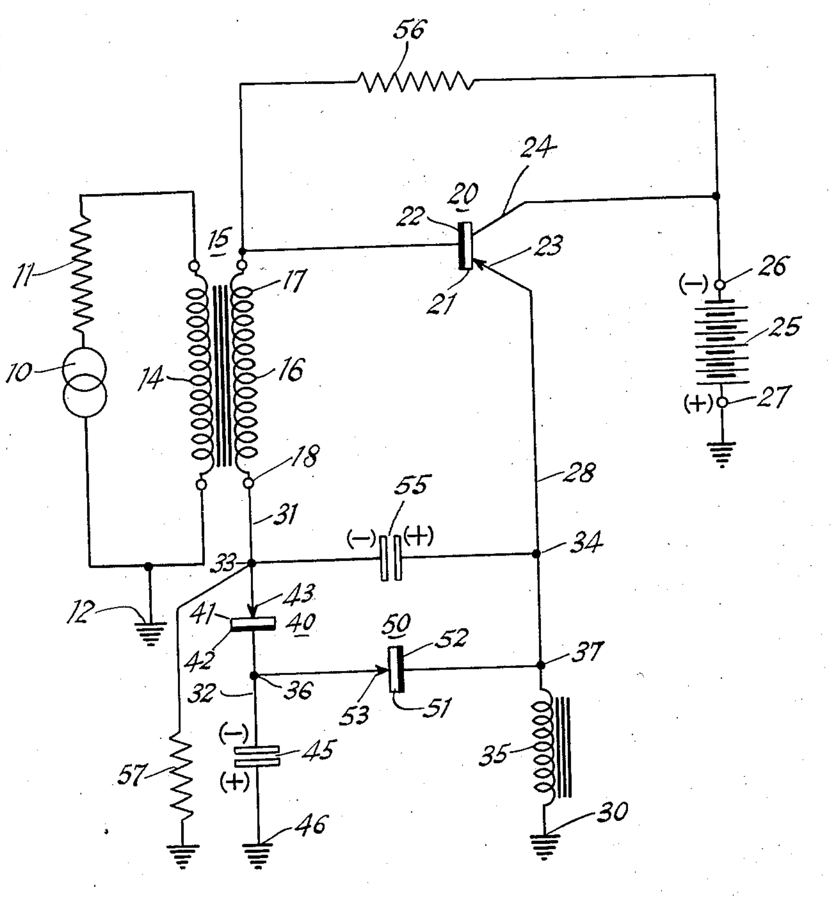
INVENTORS
BY
ATTORNEY United States Patent Office 2,863,066

Patented Dec. 2, 1958

2,863,066

REFLEX CIRCUIT SYSTEM

David De Witt, Northport, Harold Sandler, Whitestone, and Roland C. Wittenberg, New Hyde Park, N. Y., assignors to Radio Receptor Company, Inc., Brooklyn, N. Y., a corporation of New York Application May 28, 1954, Serial No. 433,190

2 Claims. (Cl. 307—88.5)

This invention relates to electronic signal amplifier circuits and, more particularly, to a reflex amplification circuit utilizing transistor triodes and diodes.

Reflex circuits of the type to which the present invention is directed are of importance as amplifiers as they reduce the number of separate signal amplifier stages required to raise a small signal input to a level high enough to effect control operations. For example, in a reflex circuit of this type, an A. C. input signal is amplified and then rectified and, using the same circuit elements, the fed back resultant rectified D. C. signal is again amplified. The reflex circuit thus achieves two stages of amplification, plus rectification, in a single stage.

However, reflex circuits as previously designed have been characterized by high power consumption, limited life of components, and complex design. These undesirable features have been due to the use of thermionic rectifiers, which not only have a limited life but also have high power consumption. Additionally, prior reflex circuits have not been capable, in a simple manner, of achieving the desired signal amplification.

The present invention is directed to a simple and economical reflex circuit characterized by substantially unlimited life of its components and an extremely low power consumption. These improvements are achieved by the use of transistor triodes and diodes in place of thermionic devices, and the provision of novel circuit interconnections. By these means, a small value A. C. input signal is amplified and rectified, and the rectified D. C. signal is reamplified, with a minimum power consumption. The amplified D. C. signal is at a level sufficient to operate a control device such as a relay.

For an understanding of the invention principles, reference is made to the following description of a typical embodiment thereof as illustrated in the accompanying drawing. In the drawing the single figure is a schematic wiring diagram of a reflex circuit embodying the invention.

The theory of operation of transistors as diodes and triodes has been set forth at length in patents and published technical articles and therefore no description will be given thereof except as relates to their function in the circuit here under consideration.

Transistors are characterized by extremely low power consumption, substantially unlimited life, and favorable amplification ratios. For example, a signal current input to one electrode with a potential applied between the other two electrodes of a triode transistor, results in an output current, through one of the other electrodes, which is a multiple of the signal input current.

The reflex circuit of the present invention utilizes a transistor triode and a pair of transistor diodes, which are preferably N-type transistors using germanium as the semi-conductor block or pellet. Referring to the drawing, an A. C. signal supplied from a generator 10 having an internal impedance 11 is applied to the primary winding 14 of a coupling transformer 15. The generator 10 and winding 14 are commonly grounded at 12.

The A. C. signal current coupled to the secondary winding 16 of transformer 15 is fed from terminal 17 to the base electrode 22 of a triode transistor 20 having a semi-conductor block 21. Emitter electrode 23 of transistor 20 is connected to ground at 30 through a conductor 28 and a relay operating coil 35. Collector electrode 24 is connected to the negative terminal 26 of a source of D. C. such as a battery 25, having a grounded, positive terminal 27.

Terminal 18 of secondary winding 16 is connected by a conductor 31 to point electrode 43 of a diode 40 including a semi-conductor block 41 and a base electrode 42. Base electrode 42 is connected by a conductor 32 to one side of a condenser 45 the other side of which is grounded at 46.

A second diode 50, including a semi-conductor block 51, has a point electrode 53, connected to junction point 36 in conductor 32, and a base electrode 52, connected to junction point 37 in conductor 28. A condenser 55 is connected between junction points 33 and 34 in conductors 31 and 28, respectively.

Emitter 23, of triode transistor 20, is connected, for A. C. current flow, to terminal 18 of secondary winding 16 through point 34, condenser 55 and point 33. This connection causes triode transistor 20 to operate as a grounded emitter, base connected triode transistor for A. C. current flow. For D. C. current flow, transistor 20 operates as a bootstrap grounded collector amplifier stage.

The A. C. input signal current is amplified by transistor 20 in the grounded emitter connection, and the amplified A. C. current flows through relay operating coil 35.

Assume the instantaneous polarity of the A. C. voltage across coil 35 is going negative. Diode 50 will conduct current, charging condenser 45 to the polarity shown. When the instantaneous A. C. voltage across coil 35 is going positive, diode 40 conducts current and diode 50 is non-conductive or "cut off."

Condenser 55 now charges to the polarity shown through transistor diode 40, condenser 45, ground, and relay operating coil 35. Condenser 45 discharges into condenser 55, providing a voltage doubling action.

The discharge D. C. current from condenser 55 through conductor 28, emitter electrode 23, block 21, base electrode 22 and secondary winding 16 constitutes a base current for transistor 20. This D. C. base current is amplified by the current gain of transistor 20 operating as a grounded collector amplification stage. Resistors 56 and 57 serve to place a small forward bias on the transistor base 22, in the absence of any signal from generator 10. It is necessary to have a small emitter current flowing, in order to realize full A. C. gain, when the signal from generator 10 is small. Resistors 56 and 57 also serve as a load to limit the effect of collector leakage current at high temperatures, which is a defect in present day germanium transistors.

The amplified D. C. current flows through relay operating coil 35, conductor 28, emitter electrode 23, collector electrode 24, power supply or battery 25 and ground to relay coil 35. This amplified D. C. control current has a value sufficient to effectively energize operating coil 35.

The reflex circuit thus amplifies and rectifies the A. C. signal current, and then amplifies the rectified D. C. current to provide a current level sufficient to effectively energize the relay coil 35 to provide a control operation responsive to an A. C. signal input current.

While a specific embodiment of the invention has been shown and described in detail to illustrate the application of the invention principles, it will be understood that the invention may be embodied otherwise without departing from such principles.

What is claimed is:

1. A reflex circuit comprising, in combination, a transistor triode including a semi-conductor block, a base electrode, a collector electrode, and an emitter electrode connected to ground; a grounded source of direct current connected in series circuit relation between said collector electrode and its ground; a direct current responsive load connected in series between said emitter electrode and ground; grounded coupling means operable to couple an alternating current input signal to said base electrode for amplification by said transistor triode, operating as a grounded emitter base input amplification stage, to provide an amplified alternating current potential across said load; and a rectifying and voltage doubling network including a first condenser connected in series between said coupling means and ground, a first diode connected in charging relation between said first condenser and said load, a second condenser connected between said emitter electrode and said coupling means, and a second diode connected in charging relation between said second condenser and the junction between said first condenser and said first diode, to deliver a direct current to said base electrode through said coupling means for amplification by said transistor triode, operating as a grounded collector amplification stage, to provide a direct operating current through said load.

2. A reflex circuit comprising, in combination, a transistor triode including a semi-conductor block, a base electrode, a collector electrode, and an emitter electrode connected to ground; a grounded source of direct current connected in series circuit relation between said collector electrode and its ground; a direct current responsive load connected in series between said emitter electrode and ground; grounded coupling means operable to couple an alternating current input signal to said base electrode for amplification by said transistor triode, operating as a grounded emitter base input amplification stage, to provide an amplified alternating current potential across said load; and a rectifying and voltage doubling network including a first condenser connected in series between said coupling means and ground, a first diode connected in charging relation between said first condenser and said load, a second condenser connected between said emitter electrode and said coupling means in parallel with said first diode, and a second diode connected in charging relation between said second condenser and the junction between said first condenser and said first diode, to deliver a direct current to said base electrode through said coupling means for amplification by said transistor triode, operating as a grounded collector amplification stage to provide a direct operating current through said load.

References Cited in the file of this patent

UNITED STATES PATENTS

| | | |
|---|---|---|
| 2,205,243 | Dome | June 18, 1940 |
| 2,222,759 | Burnside | Nov. 26, 1940 |
| 2,620,448 | Wallace | Dec. 2, 1952 |
| 2,663,800 | Herzog | Dec. 22, 1953 |
| 2,679,585 | Drazy | May 25, 1954 |
| 2,750,500 | Aiken | June 12, 1956 |

OTHER REFERENCES

Waidelich et al.: "Voltage-Multiplying Rectifiers," Proceedings of the IRE, vol. 32, No. 8, pps. 470–475, August 1944.

Ryder et al.: "Some Circuit Aspects of the Transistor," BSTJ, vol. XXVIII, pp. 367–401, July 1949.